(12) United States Patent
Mehring

(10) Patent No.: US 8,351,780 B2
(45) Date of Patent: Jan. 8, 2013

(54) IMAGING SYSTEM FOR HOLLOW CONE SPRAY

(75) Inventor: Carsten Ralf Mehring, Ladera Ranch, CA (US)

(73) Assignee: Hamilton Sundstrand Corporation, Windsor Locks, CT (US)

( * ) Notice: Subject to any disclaimer, the term of this patent is extended or adjusted under 35 U.S.C. 154(b) by 159 days.

(21) Appl. No.: 13/018,835

(22) Filed: Feb. 1, 2011

(65) Prior Publication Data

US 2012/0195578 A1 Aug. 2, 2012

(51) Int. Cl.
- G03B 41/00 (2006.01)
- G03B 15/02 (2006.01)
- G03B 37/00 (2006.01)

(52) U.S. Cl. ............. 396/334; 396/333; 396/4; 396/19; 348/36; 73/114.46

(58) Field of Classification Search ........... 396/333–334
See application file for complete search history.

(56) References Cited

U.S. PATENT DOCUMENTS

| | | | | |
|---|---|---|---|---|
| 2,779,233 | A * | 1/1957 | Dodge et al. | 356/256 |
| 3,275,744 | A * | 9/1966 | Dietrich | 348/132 |
| 4,290,558 | A | 9/1981 | Coburn et al. | |
| 4,773,596 | A | 9/1988 | Wright et al. | |
| 5,047,612 | A | 9/1991 | Savkar et al. | |
| 5,061,454 | A | 10/1991 | Birk | |
| 5,291,334 | A | 3/1994 | Wirth et al. | |
| 5,520,371 | A * | 5/1996 | Miller et al. | 266/100 |
| 5,701,156 | A * | 12/1997 | Pierce | 348/86 |
| 5,753,806 | A | 5/1998 | Ryan, III et al. | |
| 6,082,113 | A | 7/2000 | Prociw et al. | |
| 6,298,719 | B1 * | 10/2001 | Schoeffel et al. | 73/114.46 |
| 6,508,112 | B1 | 1/2003 | Verhoeven | |
| 6,668,793 | B2 * | 12/2003 | Okamoto et al. | 123/299 |
| 6,785,400 | B1 * | 8/2004 | Farina | 382/100 |
| 7,021,274 | B2 | 4/2006 | Nakayama et al. | |
| 7,182,271 | B2 * | 2/2007 | Cesak | 239/67 |
| 7,656,526 | B1 * | 2/2010 | Spuler et al. | 356/336 |
| 7,672,478 | B2 * | 3/2010 | Farina | 382/100 |
| 7,738,694 | B2 * | 6/2010 | Prociw et al. | 382/152 |
| 8,134,703 | B2 * | 3/2012 | Sivathanu et al. | 356/335 |
| 2002/0190203 | A1 * | 12/2002 | Valaskovic et al. | 250/288 |
| 2003/0098968 | A1 * | 5/2003 | Yang et al. | 356/27 |
| 2004/0055560 | A1 * | 3/2004 | Nakayama et al. | 123/298 |
| 2006/0072101 | A1 * | 4/2006 | Park | 356/28 |
| 2006/0157018 | A1 * | 7/2006 | Nakayama et al. | 123/298 |
| 2007/0204836 | A1 * | 9/2007 | Nakayama et al. | 123/445 |

(Continued)

OTHER PUBLICATIONS

Article entitled "Pre-filming primary atomization: Experiments and modeling", S. Gepperth et al., ILASS—Europe 2010, 25th Annual Conference on Liquid Atomization and Spray Systems, Brno, Czech Republic, Sep. 2010, pp. 1-9.

(Continued)

*Primary Examiner* — Clayton E Laballe
*Assistant Examiner* — Bret Adams
(74) *Attorney, Agent, or Firm* — Kinney & Lange, P.A.

(57) ABSTRACT

An imaging system to collect image data relating to a conical liquid film and its hollow conical spray emanating from an injector with a central spray axis includes a light source for emitting light into the film and spray generated by the injector; and a detector array located downstream from the injector along the central spray axis for panoramically detecting instantaneously for the entire film and spray the emitted light which has interacted with the spray to produce the image data.

20 Claims, 5 Drawing Sheets

U.S. PATENT DOCUMENTS

2007/0299561 A1* 12/2007 Montaser et al. ............. 700/283
2012/0154787 A1* 6/2012 Brady ............................ 356/27

OTHER PUBLICATIONS

Article entitled "Optical measurement of slope, thickness and velocity in liquid film flow", Than, C.F., et al., Smart Meter, Struct. 2 (1993), pp. 13-21.

Article entitled "Development of a Non-intrusive Film Thickness Measurement Technique for Dynamic Shear-Driven Thin Liquid Films", Friedrich, M.A., et al., Department of Mechanical and Aerospace Engineering, University of Missouri-Rolla, MO, pp. 1-9.

Research Article entitled "Measurement of the gradient field of a turbulent free surface", Savelsberg, Ralph et al., Exp Fluids (2006) 41:629-640.

Research Article entitled "Accurate point finding with simple devices", SPIE Newsroom: SPIE, Caulfield, John H., Dec. 10, 2009, pp. 1-3.

* cited by examiner

IMAGING SYSTEM FOR HOLLOW CONE SPRAY

BACKGROUND

Combustion engines, such as gas turbine engines in aircraft, typically work by turning chemical energy in fuel into mechanical or propulsive energy. This is generally done by injecting liquid fuel into a combustion chamber where it is vaporized and then mixed with air from the compressor section of the engine. Subsequent combustion of the reactive gaseous fuel-air mixture provides combustion products with high thermal energy which can subsequently be converted into propulsive forces and/or mechanical rotary shaft energy.

To vaporize and burn the fuel during the short residence time within the combustion chamber, it is ideal to atomize the liquid fuel stream into small droplets. These small droplets give the fuel a larger surface area to more quickly vaporize. This atomization can by done by using a hollow-cone injector such as the prefilming fuel injectors frequently used in propulsion and APU (Auxiliary Power Unit) gas turbine engines. Here, liquid fuel is admitted onto an annular surface. The fuel forms a film that is pulled along the surface by sheer forces from an airstream. At the edge of the surface, the film is discharged into the combustor volume. It stays as a film for a short period, eventually rupturing due to instabilities. At rupture, the film first forms ligaments and then small droplets, i.e., a droplet spray, ideal for vaporization.

SUMMARY

An imaging system to collect image data relating to a hollow conical disintegrating liquid film and the resulting droplet spray with a central conical-film or spray axis from an injector includes a light source for emitting light into the liquid film or spray from the injector; and a detector array located downstream from the injector along the central liquid film/spray axis for panoramically detecting the emitted light which has interacted with the film or spray to produce the image data.

A method of collecting image data on a hollow-cone spray from an injector nozzle with a center liquid film or spray axis includes positioning a detector array along the center liquid film or spray axis downstream from the injector nozzle; directing light from a light source radially towards the conical film or spray in a plane perpendicular to the center liquid film or spray axis; injecting fuel through the nozzle to form a conical film and hollow-cone spray; and panoramically collecting at the detector array the light from the light source that has interacted with the spray or film.

DETAILED DESCRIPTION

Figure 1:
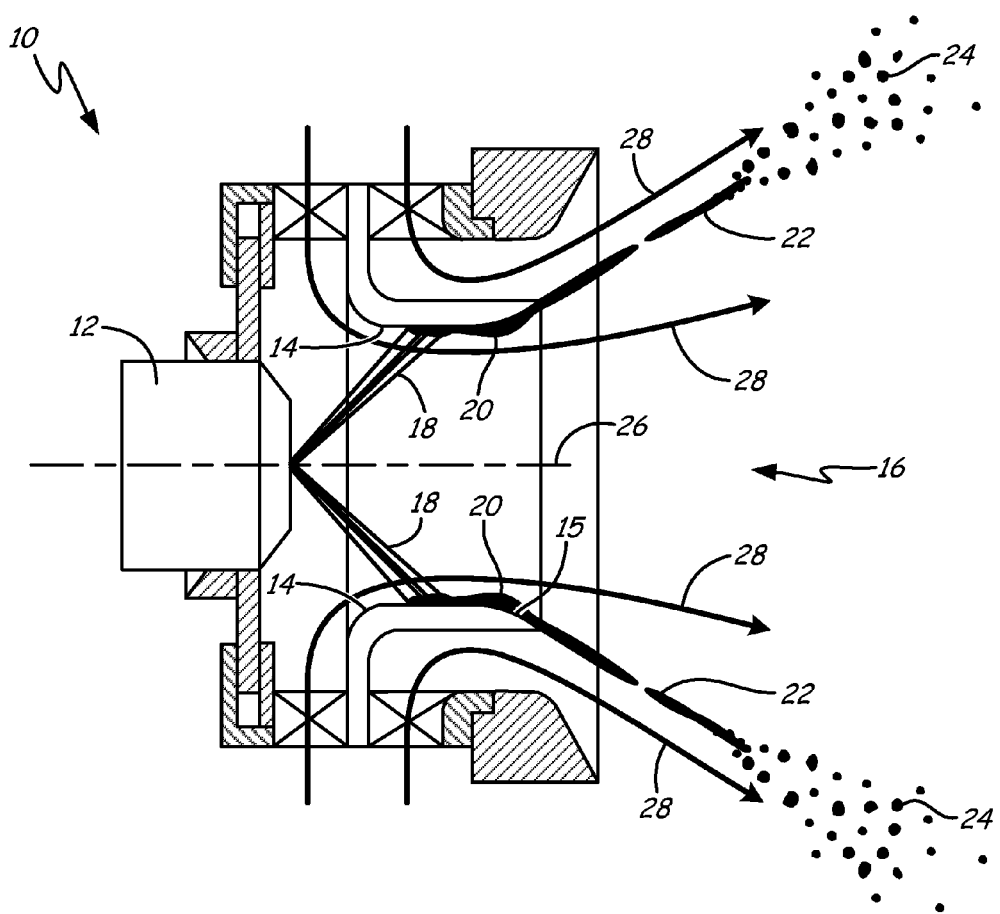
FIG. 1 is a cross-sectional view of a typical gas turbine pre-filming atomizer generating a hollow-cone fuel film and subsequently hollow cone spray.

FIG. 1 is a cross-sectional view of a typical gas turbine pre-filming atomizer generating a hollow-cone fuel film and subsequently fuel spray, and includes pre-filming atomizer 10 with injection nozzle 12; pre-filming surface 14 with edge 15; fuel spray 16 with film section 20, ligament section 22, droplets 24 and center spray axis 26. Arrows 28 indicate airflow.

Injection nozzle 12 delivers continuous fuel flow 18 towards pre-filming surface 14. Pre-filming surface 14 is an annular surface with edge 15. Airflow 28 moves fuel along pre-filming surface 14 and discharges it at edge 15 as continuous film 20. At some point shortly after launch, disturbances in film 20 form and propagate, rupturing film 20 into ligaments 22. Ligaments 22 then break down further into droplets 24 which are vaporized in the combustion chamber (not shown).

As mentioned in the background section, forming droplets 24 from fuel film 20 allows for quick vaporization due to the increased surface area of droplets 24 as compared to the initial film 20. Droplets 24 are formed when film 20 ruptures. Rupture is generally caused by disturbances in film 20 after launch from edge 15 of pre-filming surface 14. A better understanding of the formation and propagation of these disturbances, and thus the rupture of film 20, would enhance the ability to design more efficient atomizers 10 to more quickly and better atomize and vaporize the injected fuel. This could allow for a more efficient combustor design, and thus a more efficient and cleaner (i.e., with respect to emissions) engine. To form this understanding it is essential to be able to take accurate measurements of film and spray properties, such as film and ligament thickness and geometry and local film, ligament and droplet velocities at various stages downstream from the nozzle.

In past systems, data could be collected for a liquid film propagating on a planar pre-filming surface. Data and images of the stability and distortion of the film could be collected by positioning light emitting and light collecting fiber optic fibers or laser-light emitting and collecting optics in positions to emit light and then collect it to determine thickness, slope and wave velocity on a planar bound liquid film, as described in "Optical measurement of slope, thickness and velocity in liquid film flow," Smart Mater. Struct. 2 (1992) 13-21 (hereinafter "Reference 1") and in "Development of a Non-intrusive Film Thickness Measurement Technique for Dynamic Shear-driven Thin Liquid Films," Proc. $20^{th}$ Ann. Conf. ILASS 2007 (hereinafter "Reference 2"). Light emitted was reflected at the air-liquid interface or liquid-wall interface as well as refracted and transmitted through the film to collecting fiber optic fibers placed upstream and downstream of the transmitting fiber (Reference 1) or to laser-light collecting optics (Reference 2). The way the light moved through the film and interacted with the air-liquid or liquid-wall interface gave information which allowed the determination of film thickness and, in the case of Reference 2, slope and wave velocity. Due to the pre-filming surface being planar it was relatively simple to calculate film properties and position fibers to collect information. However, it is a challenge to be able to observe film characteristics and film dynamics and disintegration on films which are three-dimensional and have two free flowing surfaces, such as a hollow cone liquid film.

The current invention allows for the capturing and recording of data from a hollow-cone fuel film and spray through the use of a light source and a detector array positioned at center spray axis 26 to collect panoramic data to better understand spray 16 from liquid film discharged from pre-filming surface 14.

Figure 2A:
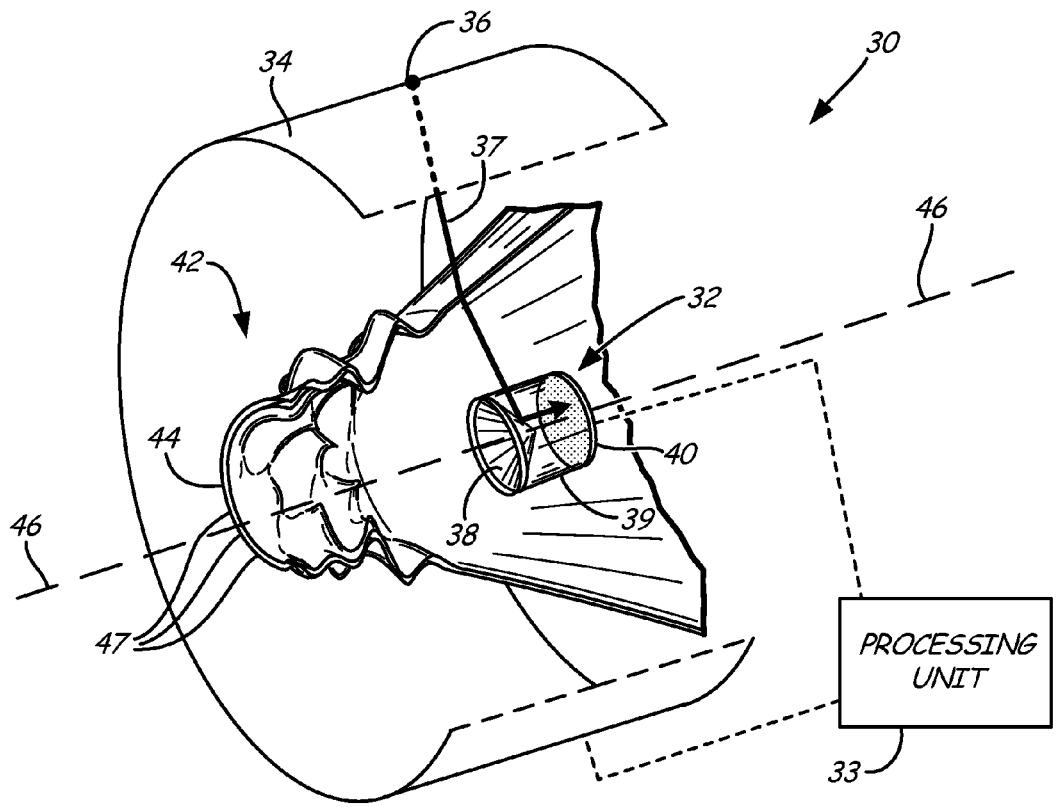
FIG. 2A shows a three-dimensional spray with a section cutout to view an imaging system according to a first embodiment of the present invention.
Figure 2B:
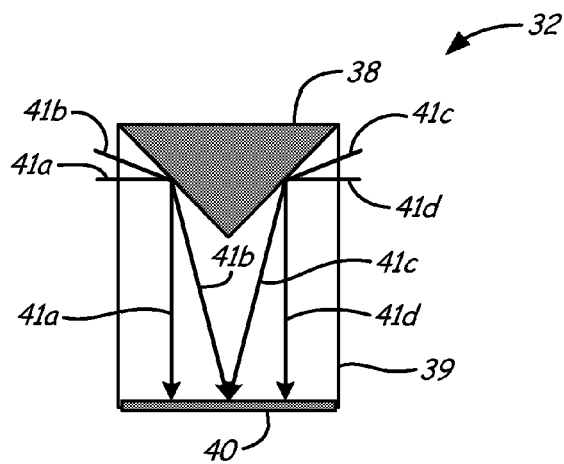
FIG. 2B shows a cross-sectional view of the detector array of FIG. 2A with example light ray paths.

FIG. 2A shows a three-dimensional spray with a section cutout to view an imaging system according to a first embodiment of the present invention. FIG. 2B shows a cross-sectional view of the detector 32 of FIG. 2A including example light ray paths. FIG. 2A includes imaging system 30 consisting of detector 32, processing unit 33 and external cylinder 34 (with section cutout for viewing purposes only) containing optical light emitters (with example light emitter 36 emitting light ray 37). Detector 32 includes conical mirror 38 protective cylinder 39 and planar detector array 40. FIG. 2A further includes cross-section of hollow-cone film injection spray 42 with discharge location 44, injection locations 47 for fluidic dye or tracer particles and center spray axis 46. FIG. 2B further includes example light beam paths 41a, 41b, 41c, 41d. While detector array 32 has been shown to use conical mirror 38, mirror 38 could be a hyperbolic mirror. The use of fluidic dye and/or tracer particles injected into film 42 or onto the outer and/or inner film 42 surfaces may enhance data collection by optical system 30 as the fluidic dye or tracer particles interact with light rays.

External cylinder 34 surrounds film spray 42 and has a light source which can comprise a circumferential array of optical fibers emitting light radially towards film 42 center spray axis 46. Alternatively, light could be emitted radially towards film 42 by a circumferential array of light emitting diodes. External cylinder 34 can also include referencing media such as a graphing background or additional collection optical fibers for collecting data on light reflected back towards cylinder 34. Conical mirror 38 sits inside hollow cone film injection spray 42 downstream from injector nozzle (not shown) at center spray axis 46. Planar detector array 40 also is positioned within hollow cone spray 42. Planar detector array 40 can be a charge coupled device ("CCD") camera or additional collection fiber optics to collect light reflected from conical mirror 38. Processing unit 33 is connected to planar detector array 40 through either a wireless connection or through electrical wires or fiberoptics. In a case of a fiberoptis collection array, optical fibers could be extended to processing unit 33, allowing collocation of detector array 40 and processing unit 40.

Emitters on external cylinder 34 emit light rays radially towards spray 42 center axis 46. Light rays are refracted and transmitted through film 42. Refraction and transmission may be affected by particle or dye injection into film 42 at positions 47. Conical mirror 38 panoramically deflects light rays toward planar detector array 40. Planar detector array 40 receives light rays deflected from conical mirror 38 and collects data regarding deflected light rays. Planar detector array 40 then transmits that data to processing unit 33. For example purposes, the path of light from emitter 36 is shown. Light ray 37 is emitted from emitter 36 radially towards spray 42 center axis 46. Light ray 37 is both refracted and transmitted through film 42. In addition, some of the light-ray energy may be reflected back onto cylinder 34 and detected by collection optical fibers also located on cylinder 34. The data recorded by planar detector array 40 (as well as any data recorded by supplemental collection optical fibers on cylinder 34) can be in the form of, for example, angles of refraction through film 42 or a panoramic photograph of film 42 at an instant during injection. FIG. 2B illustrates how conical mirror 38 deflects various light rays 41a, 41b, 41c, 41d towards planar detector array 40 to collect data. The data allows for the instantaneous determination of film/ligament thickness, droplet size, film/ligament/droplet velocity and other measurements simultaneously around the entire circumference of film spray 42.

Imaging system 30, through the use of conical mirror 38, planar detector array 40 and light emitting source (cylinder 34 with emitters) allows for the panoramic collection of data on a free hollow-cone film disintegrating into a hollow-cone spray. The system can be used to take instantaneous measurements of the entire circumference of film spray 42 to determine distribution of film/ligament thickness, spray/droplet size, local film/ligament/droplet velocity or even to simply take still panoramic photographs of film spray 42 at certain instants in time. This data aids in understanding the film atomization process by providing accurate instantaneous as well as time-averaged measurements of the patternation and circumferential non-uniformities in conical fuel film sprays (i.e., fuel films and the sprays resulting from film disintegration). These all can improve the understanding of the dynamics of film disturbances and the film rupture process which can aid in the design of more efficient injector systems.

In an alternate embodiment the light path in FIGS. 2A-2B can be reversed, making cylinder 34 a light collector and planar surface 40 a light emitting surface (e.g., optical fiber array or expanded laser beam). The increased detector surface area would yield improved image resolution at the expense of increased costs for detector array hardware.

Figure 3A:
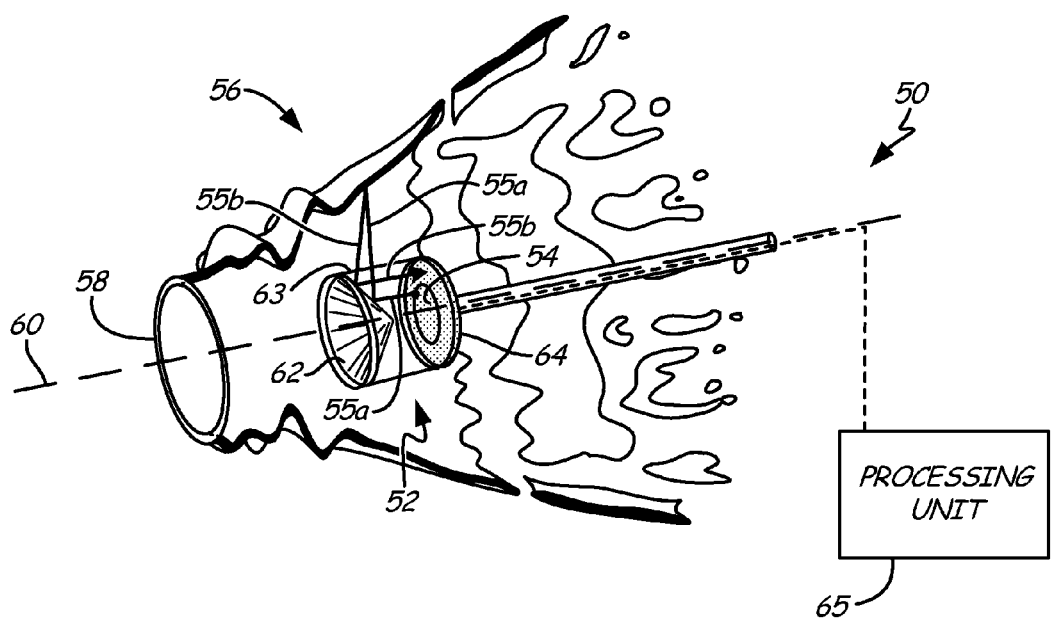
FIG. 3A shows a three-dimensional spray with a section cutout to view an imaging system according to a second embodiment of the present invention.
Figure 3B:
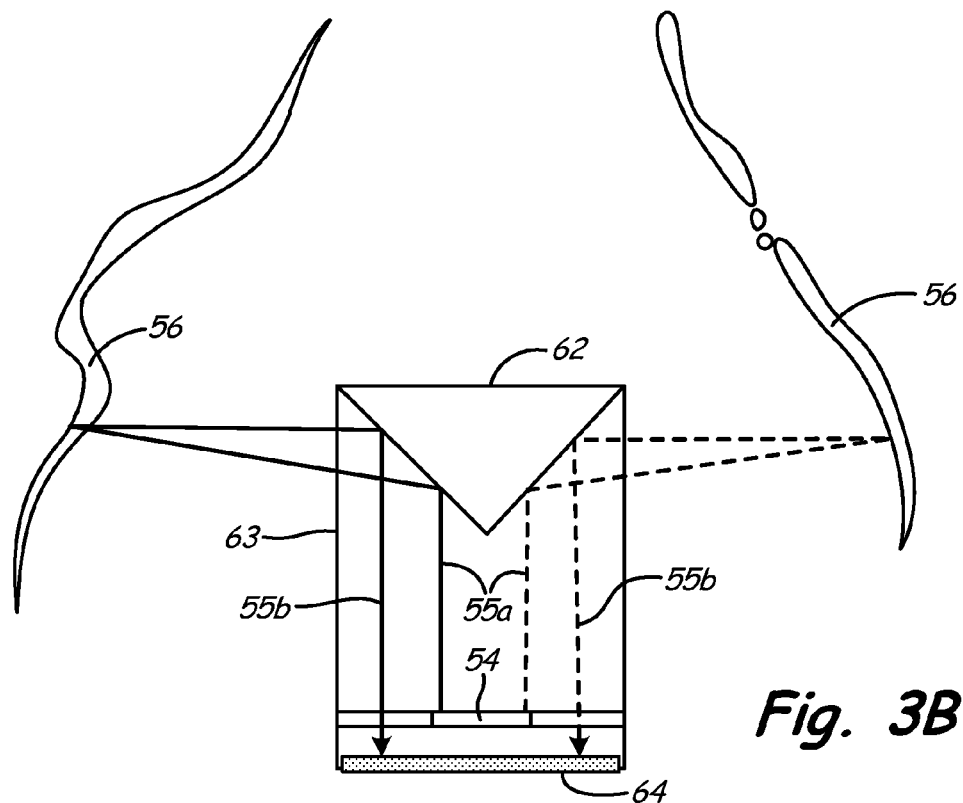
FIG. 3B shows a cross-sectional view of the detector array of FIG. 2A with example light ray paths.

FIG. 3A shows a three-dimensional fuel film spray with a section cutout to view an imaging system according to a second embodiment of the present invention. FIG. 3B shows a cross-sectional view of the detector array of FIG. 3A. FIGS. 3A-3B includes imaging system 50 with emitter/detector system 52 and optical emitter 54, cross-section of hollow-cone film injection spray 56 with discharge location 58, center spray axis 60, and processing unit 65. As shown in FIGS. 3A and 3B, emitter/detector system 52 includes conical mirror 62, protective cylinder 63, planar detector array 64 and planar emitter array 54 yielding example light ray paths 55a and 55b. Planar detector array 64 can be a charge coupled device ("CCD") camera or additional collection fiber optics to collect light reflected from conical mirror 62. As mentioned in relation to FIGS. 2A-2B, conical mirror 62 could be replace with a hyperbolic mirror.

In this embodiment, imaging system 50 components are located entirely within film spray 56. Conical mirror 62 is positioned downstream from injector nozzle (not shown) at center spray axis 60. Light emitter 54 and detector array 64 are connected to conical mirror 62 by protective cylinder 63 and also sit at center spray axis 60. Light emitter 54 sits directly above detector array 64. Processing unit 65 is connected to detector array 64 either through electronic wires or wirelessly using a transmitter and a receiver.

Light emitter 54 can be fiber optical fibers emitting light to mirror 62, where the light is reflected radially outwards to be transmitted, refracted and reflected by film spray 56. Conical mirror 62 receives light reflected back from film 56 and reflects the received light toward planar detector array 64. Planar detector array 64 receives the light from conical mirror 62 and transmits image data from film spray 56 to processing unit 65. Example light ray path 55a-55b is shown. Light ray 55a is emitted generally axially from emitter 54 towards conical mirror 62, which reflects light ray 55a towards film spray 56. Part of light ray 55b is reflected off inner surface of film spray 56 back towards conical mirror 62 and part of light ray 55b is reflected off outer surface of film spray 56 back towards conical mirror 62. Conical mirror 62 reflects received light rays 55b generally axially towards planar detector array 64, which transmits image data or light interference signals to processing unit 65.

Figure 3C:
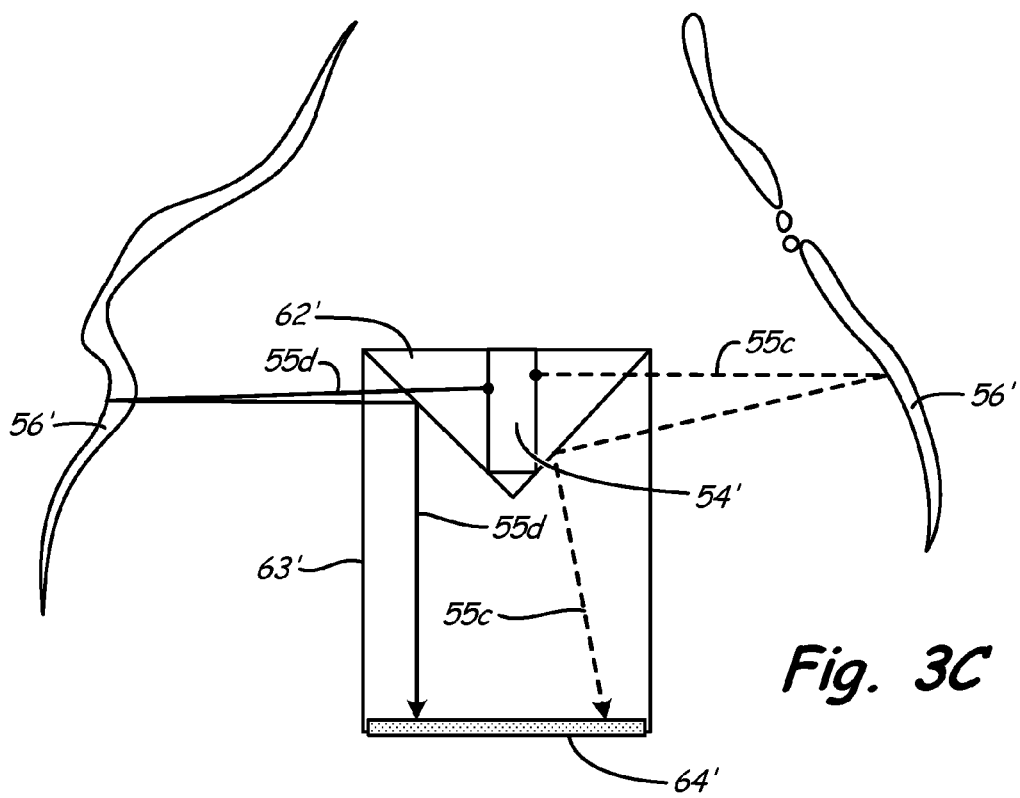
FIG. 3C shows a cross-sectional view of an alternative embodiment of FIGS. 3A-3B where light emitter is located within a conical mirror.

FIG. 3C shows a cross-sectional view of an alternative embodiment of FIGS. 3A-3B where light emitter is located within conical mirror, and includes light emitter 54', film spray 56', conical mirror 62', protective cylinder 63', detector array 64' and example light ray paths 55c and 55d. Conical mirror 62' is semi-permeable.

Light emitter 54' is located within volume of conical mirror 62' and emits light axially through semi-permeable conical mirror 62'. Light rays 55c and 55d are refracted and reflected by film spray surfaces. The portion of light rays 55c and 55d that are reflected by film spray 56' is reflected by conical mirror 62' towards detector array 64'. Data is then transferred to processing unit 65 from detector array 64' as described in relation to FIGS. 2A-3B.

Imaging system 50 allows for the collection of data to determine film/ligament thickness, spray droplet size and density, film/ligament/droplet velocity, etc., as in the first embodiment of the imaging system shown in FIG. 2. This data helps to understand the formation and propagation of film disturbances and film rupturing. In this second embodiment, the entirety of imaging system 50 is positioned together inside of film spray 56. This is advantageous in terms of having fewer devices to carefully position for data collection tests using imaging system 50, thereby reducing the time required to set up and run tests using imaging system 50. It further brings economic advantages in not having to manufacture extra equipment to hold the outer light source that would need to vary in size for different size sprays.

Figure 4A:
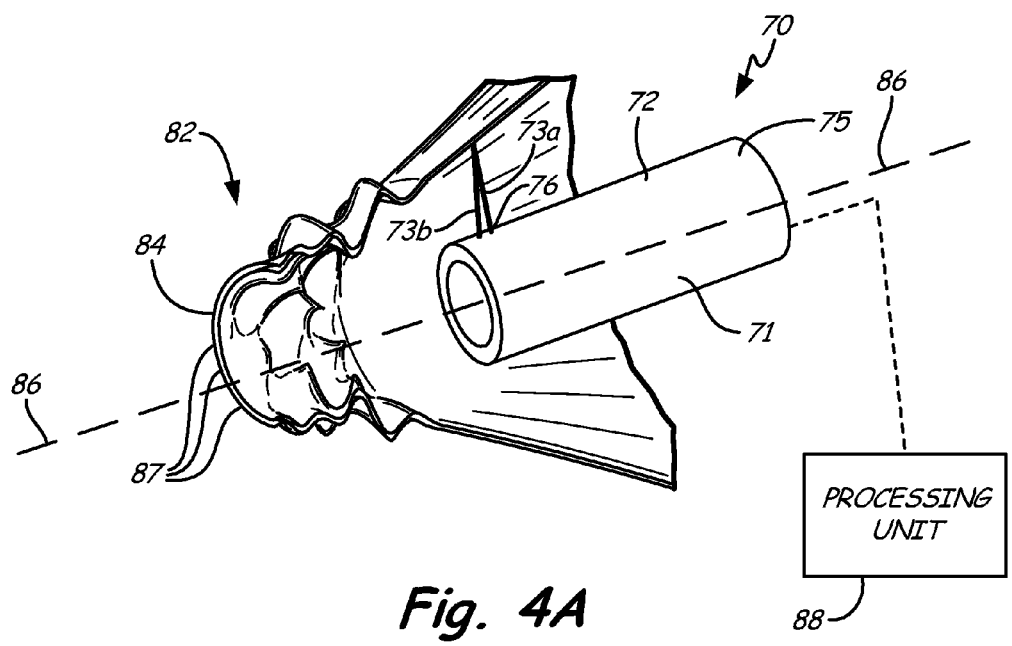
FIG. 4A shows a three-dimensional spray with a section cutout to view an imaging system according to a third embodiment of the present invention.
Figure 4B:
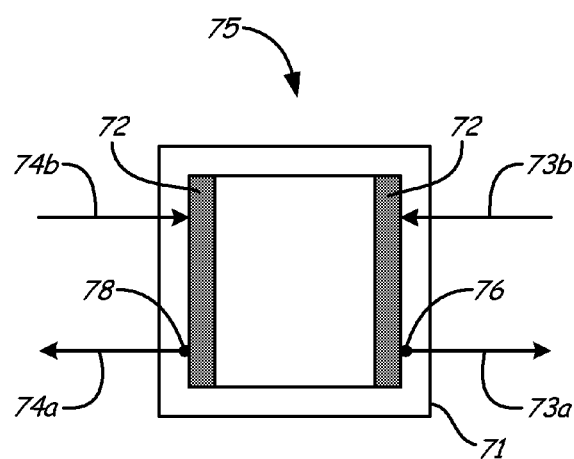
FIG. 4B shows a cross sectional view of example light rays being collected by the detector array of FIG. 4A.

FIG. 4A shows a three-dimensional spray with a section cutout to view an imaging system according to a third embodiment of the present invention. FIG. 4B shows a cross sectional view of example light rays being collected by detector 75 of imaging system 70 of FIG. 4A. FIGS. 4A-4B include detector 75 with protective cylinder 71, cylindrical detector array 72 example light rays 73a-73b, and 74a-74b, example optical emitters 76, 78 and processing unit 80; cross-section of hollow-cone film injection spray 82 with discharge location 84, fluidic dye or seed/tracer particle injection locations 87, center spray axis 86 and processing unit 88. Detector array 72 is a cylindrical device with optical sensors (either photodetectors or optical fibers that direct light to a photodetector array) positioned circumferentially and facing radially outward. Cylinder 71 is transparent and protects detector array 72. In the embodiment shown, optical emitters 76, 78 are example optical emitters in the form of light emitting fiber optic fibers. Additional optical emitters would be positioned circumferentially around optical cylindrical device to emit light radially towards spray 82. In alternative embodiments, emitters could be positioned outside of spray 82 using a cylinder surrounding film spray 82 and positioned to emit light radially inwards towards spray as shown in FIG. 2.

Light is emitted radially from emitters 76, 78 towards film spray 82. Light is then refracted and reflected by film spray 82. A portion of light rays 73a, 73a are transmitted through film spray 82. Data on reflected light, such as light rays 73b, 74b, is collected by detector array 72. This data is then transmitted to processing unit 88, either wirelessly with a transmitter and a receiver or through electrical wires connected to detector array 72. Supplemental data on light transmitted through the film spray can be collected by a cylindrical detector array surrounding film spray 82 delivering additional information to data processing unit 88 and aiding in the determination of film spray properties (not shown in FIGS. 4A-4B).

In this third embodiment, instead of having the light which interacted with spray 82 reflected to a detector array device by a conical mirror, detector array 72 directly collects data on the light. Optical fibers located all around circumference of detector array are able to directly collect and record a panoramic image of the hollow-cone spray to aid in understanding spray 82 and its properties.

In summary, the imaging system of the current invention uses panoramic detectors and a light source to be able to obtain panoramic data related to liquid films/ligaments and their sprays generated from hollow-cone injectors. This ability to get instantaneous and time-averaged data measurements on the entire circumference of the conical film spray by positioning the detector array within the cone spray on the center spray axis allows for a better understanding of the liquid film, film instabilities or disturbances leading to film breakup. This aids in understanding the spray pattern resulting from the conical film and its disintegration. A better understanding of film rupture and spray pattern can lead to the development and design of injector nozzles and injector systems with improved performance characteristics.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. An imaging system to collect image data relating to a hollow conical spray with a central spray axis from an injector, the system comprising:
   a light source for emitting light into the spray from the injector; and
   a detector array located downstream from the injector along the central spray axis for panoramically detecting the emitted light which has interacted with the spray to produce the image data.

2. The system of claim 1, and further comprising:
   a mirror for deflecting the light toward the detector array.

3. The system of claim 2, wherein the mirror is a conical mirror.

4. The system of claim 2, wherein the mirror is a hyperbolic mirror.

5. The system of claim 2, wherein the detector array is a planar detector array.

6. The system of claim 5, wherein the planar detector array includes a charge coupled device camera.

7. The system of claim 5, wherein the planar detector array includes a fiber optics light collection array.

8. The system of claim 1, wherein the detector array includes a cylindrical detector array.

9. The system of claim 8, wherein the cylindrical detector array includes a fiber optics light collection array.

10. The system of claim 1, and further comprising:
    a processing unit for receiving image data from the detector array.

11. The system of claim 10, wherein the processing unit is connected to the detector array by electrical wires or optical fibers.

12. The system of claim 10, wherein the processing unit is connected wirelessly to the detector array using a transmitter at the detector array and a receiver at the processing unit.

13. The system of claim 1, wherein the detector array comprises:
a camera for collecting panoramic images of the spray.

14. The system of claim 1, wherein the light source comprises:
a cylinder surrounding the spray and coaxially aligned with the injector; and
a plurality of light emitting elements connected to the cylinder and oriented radially inward towards the spray.

15. The system of claim 1, wherein the light source is located proximate the detector array and emits light radially outward.

16. A method of collecting image data on a hollow-cone spray from an injector nozzle with a center spray axis, the method comprising:
positioning a detector array along the center spray axis downstream from the injector nozzle;
directing light from a light source radially towards the injector spray in a plane perpendicular to the center spray axis;
injecting fuel through the nozzle to form a spray; and
panoramically collecting at the detector array the light from the light source that has interacted with the spray.

17. The method of claim 16, and further comprising:
positioning a mirror at the center spray axis downstream from the injector nozzle to deflect light that has interacted with the spray towards the detector array.

18. The method of claim 16, wherein the detector array includes a planar detector array.

19. The method of claim 16, wherein the detector array includes a cylindrical detector array.

20. An apparatus for collecting panoramic data on a hollow-cone film spray with a center spray axis from an injector, the apparatus comprising:
a light source emitting light radially toward the spray in a plane perpendicular to the center spray axis;
a detector array positioned along the central spray axis the hollow-cone film spray to detect light from the light source after the light has interacted with the spray; and
a conical mirror positioned along the central axis of the spray downstream from the injector to reflect light towards the detector array after the light has interacted with the spray.

* * * * *